United States Patent
Pedersen et al.

(10) Patent No.: US 12,443,995 B1
(45) Date of Patent: *Oct. 14, 2025

(54) VIRTUAL TRADING FLOOR

(71) Applicant: Cboe Exchange, Inc., Chicago, IL (US)

(72) Inventors: Scott Paul Pedersen, Barrington, IL (US); Jordan Newmark, Evanston, IL (US)

(73) Assignee: Cboe Exchange, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/436,369

(22) Filed: Feb. 8, 2024

Related U.S. Application Data

(63) Continuation of application No. 17/227,018, filed on Apr. 9, 2021, now Pat. No. 11,928,731.
(Continued)

(51) Int. Cl.
*G06Q 40/00* (2023.01)
*G06Q 40/04* (2012.01)
(Continued)

(52) U.S. Cl.
CPC ............. *G06Q 40/04* (2013.01); *H04L 67/12* (2013.01); *H04L 67/131* (2022.05)

(58) Field of Classification Search
CPC ........ G06Q 40/04; H04L 67/12; H04L 67/131
See application file for complete search history.

(56) References Cited

U.S. PATENT DOCUMENTS 7,020,632 B1    3/2006  Kohls et al.
7,124,164 B1 *  10/2006 Chemtob ............ H04L 12/1831
                                                709/204
(Continued)

FOREIGN PATENT DOCUMENTS

WO   WO 2000042552       7/2000
WO   WO-2009092060 A2 *  7/2009  ............. A63F 13/10
WO   WO 2013062509       5/2013

OTHER PUBLICATIONS

Wu et al: "Understanding freehand gestures: a study of freehand gestural interaction for immersive VR shopping applications", Human-centric Computing and Information Sciences, vol. 9, article No. 43, Published: Dec. 10, 2019 (Year: 2019).*

(Continued)

*Primary Examiner* — Edward J Baird
(74) *Attorney, Agent, or Firm* — Fish & Richardson P.C.

(57) ABSTRACT

A method for virtual floor trading implemented via an exchange system includes establishing a secure connection with a first market participant and transmitting, to a computing device associated with a first market participant, data causing a graphical user interface (GUI) of the computing device to render a graphical representation of a virtual trading floor associated with the exchange system. The method also includes receiving a first order and transmitting, to a second computing device associated with a second market participant, data causing a GUI of the second computing device to render a second graphical representation of the virtual trading floor comprising a first virtual trader associated with the first market participant. The method includes receiving, from the second computing device, a second order, determining that the second order matches the first order, and executing a transaction based on the first order and the second order.

19 Claims, 2 Drawing Sheets

Related U.S. Application Data

(60) Provisional application No. 63/007,914, filed on Apr. 9, 2020.

(51) Int. Cl.
*H04L 67/12* (2022.01)
*H04L 67/131* (2022.01)

(56) References Cited

U.S. PATENT DOCUMENTS

| | | | |
|---|---|---|---|
| 7,478,129 | B1 | 1/2009 | Chemtob |
| 8,640,946 | B1 | 2/2014 | Block et al. |
| 2002/0038279 | A1 | 3/2002 | Samuelson et al. |
| 2002/0111893 | A1 | 8/2002 | Shifrin-Cassidy |
| 2002/0133449 | A1 | 9/2002 | Segal et al. |
| 2003/0126068 | A1* | 7/2003 | Hauk ............ G06Q 30/08 705/37 |
| 2004/0044614 | A1 | 3/2004 | Wagner |
| 2004/0117292 | A1* | 6/2004 | Brumfield ........ G06Q 40/00 705/37 |
| 2004/0186806 | A1 | 9/2004 | Sinclair et al. |
| 2005/0234813 | A1 | 10/2005 | West et al. |
| 2006/0004646 | A1 | 1/2006 | Schoen et al. |
| 2007/0168359 | A1 | 7/2007 | Jacob et al. |
| 2008/0120150 | A1 | 5/2008 | McSheffrey et al. |
| 2009/0164359 | A1 | 6/2009 | Loui et al. |
| 2009/0254843 | A1 | 10/2009 | Van Wie et al. |
| 2009/0318234 | A1 | 12/2009 | Christensen et al. |
| 2010/0191640 | A1 | 7/2010 | Tilly et al. |
| 2011/0093348 | A1 | 4/2011 | Hudson et al. |
| 2011/0183732 | A1* | 7/2011 | Block ............ G06Q 50/34 463/1 |
| 2011/0307400 | A1 | 12/2011 | Chang |
| 2012/0016926 | A1 | 1/2012 | Toga et al. |
| 2013/0054690 | A1 | 2/2013 | Wei et al. |
| 2013/0271456 | A1 | 10/2013 | Haswell et al. |
| 2014/0047027 | A1 | 2/2014 | Moyers |
| 2015/0073970 | A1 | 3/2015 | Merold et al. |
| 2015/0127509 | A1 | 5/2015 | Studnitzer et al. |
| 2016/0180447 | A1 | 6/2016 | Kamalie et al. |
| 2016/0196596 | A1 | 7/2016 | Van Wie et al. |
| 2017/0195266 | A1 | 7/2017 | Moyers |
| 2019/0205727 | A1* | 7/2019 | Lin ............ G06F 18/217 |
| 2020/0162617 | A1 | 5/2020 | Hasegawa |
| 2020/0265517 | A1 | 8/2020 | Kim et al. |
| 2020/0320623 | A1 | 10/2020 | McGrath |
| 2020/0328908 | A1 | 10/2020 | Howland et al. |
| 2020/0334750 | A1 | 10/2020 | Mohanraj et al. |
| 2022/0124283 | A1 | 4/2022 | Krol et al. |

OTHER PUBLICATIONS

U.S. Appl. No. 17/227,018, filed Apr. 9, 2021, Pedersen.

Hofman-Kohlmeyer, "Research potential in virtual worlds. An example of Second Life," World Scientific News WSN, 2017, 89:225-230.

\* cited by examiner

VIRTUAL TRADING FLOOR

CROSS-REFERENCE TO RELATED APPLICATION

This patent application is a continuation (and claims the benefit of priority under 35 USC 120) of U.S. patent application Ser. No. 17/227,018, filed Apr. 9, 2021, now U.S. Pat. No. 11,928,731 B1, issued on Mar. 12, 2024, which claims the benefit of U.S. Provisional Patent Application No. 63/007,914, filed Apr. 9, 2020, which is incorporated herein by reference in its entirety.

TECHNICAL FIELD

Cboe technology enables the trading of financial instruments in electronic exchanges, and in hybrid exchanges that combine electronic and open-outcry trading mechanisms.

BACKGROUND

In response to the COVID-19 pandemic, many exchanges shut down their trading floors. The shutdowns were necessary in view of overriding public health interests, but they came at significant cost. For example, the temporary suspension of open-outcry trading mechanisms in view of the unprecedented requirement for physical distancing eliminated an enormous pool of information that market makers and brokers need in order to provide tight, deep markets in the world's most utilized financial instruments. Those same conditions reduced market liquidity, increased the risks faced by individual market makers to the point that many lost their businesses, and increased broker ticket prices to levels that were unsustainable for many customers.

In this way, the COVID-19 pandemic revealed that it can no longer be taken for granted that the physical trading floors on which open-outcry trading has traditionally taken place will remain consistently available to authorized market participants.

Beyond that concern, the traditional requirement that all open-outcry trading associated with an exchange be performed on the exchange's physical trading floor has limited the effectiveness of open-outcry mechanisms as a means for safely and fairly distributing information to market participants. The clamor of trading activity within a crowd can, for example, sometimes make it difficult for a particular market participant to hear or be heard, and physical altercations have been known to occur on some trading floors.

In at least these ways, the traditional tie between open-outcry and physical trading floors has limited open-outcry's safety, fairness, and effectiveness as a means for facilitating the distribution of information among and between market participants.

SUMMARY

The disclosure that follows relates to a Virtual Trading Floor ("VTF") that is implemented via an exchange computer system. The VTF is integrated with other components of that system such that it enables remote market participants to interact with one another and to engage in open-outcry trading practices in a virtual environment that simultaneously facilitates the trading of financial instruments through the exchange.

Each market participant connected to the VTF can be represented within the VTF by a virtual trader, and can engage in open-outcry trading practices facilitated through the VTF that are similar to open-outcry trading practices performed on physical trading floors. Market participants can enter orders within the VTF, and these orders can be matched and executed by the exchange computer system in a manner similar to orders received by the exchange computer system from other sources. Each market participant is responsible for orders entered via the VTF pursuant to the rules of the exchange. The VTF can be used to trade financial instruments including, but not limited to, securities, commodities, and other financial products.

Among other advantages, the VTF enables market participants to trade from remote locations in a virtual environment that resembles a physical trading floor. The VTF enables market participants to conduct open-outcry trading in reliance on observations of, and interactions with, other traders within the VTF, without being subject to the burdens and hazards of traveling to, and being physically present on, a physical trading floor.

According to some aspects, a method for virtual floor trading implemented via an exchange computer system includes establishing a secure connection with a first market participant and transmitting, from the exchange computer system to a first computing device associated with a first market participant, data causing a graphical user interface of the first computing device to render a first graphical representation of a virtual trading floor associated with the exchange computer system. The method also includes receiving, from the first computing device, a first financial instrument transaction order, and transmitting, from the exchange computer system to a second computing device associated with a second market participant, data causing a graphical user interface of the second computing device to render a second graphical representation of the virtual trading floor comprising a first virtual trader associated with the first market participant engaging in one or more actions indicative of the first financial instrument transaction order. The method includes receiving, from the second computing device, a second financial instrument transaction order, determining that the second financial instrument transaction order matches the first financial instrument transaction order, and executing, by one or more processors associated with the exchange computer system, a transaction based on the first financial instrument transaction order and the second financial instrument transaction order.

In some implementations, the first graphical representation of the virtual trading floor associated with the exchange computer system includes a graphical representation of a second virtual trader associated with the second market participant. The first graphical representation of the virtual trading floor can be a three-dimensional graphical representation, and the graphical representation of the second virtual trader can be a three-dimensional graphical representation.

In some implementations, the method includes receiving, from the second computing device, data for configuring the graphical representation of the second virtual trader. The data for configuring the graphical representation of the second virtual trader can include one or more user inputs provided by the second market participant via the second computing device, and can include one or more inputs derived from one or more sensors associated with the second computing device.

In some implementations, the one or more actions indicative of the first financial instrument transaction order include a movement performed by the first virtual trader. The movement can, for example, be performed by the first virtual trader in response to receiving the first financial instrument transaction order. The method can include receiving, from the first computer device, data indicative of the one or more actions, and the movement can performed by the first virtual trader in response to receiving the data indicative of the one or more actions. The data indicative of the one or more actions can include one or more user inputs provided by the first market participant via the first computing device, and can include one or more inputs derived from one or more sensors associated with the first computing device.

In some implementations, the graphical user interface of the first computing device is configured to receive inputs for controlling the first virtual trader. The inputs for controlling the first virtual trader can be received via a mouse and keyboard, a microphone, and/or one or more sensors associated with the first computing device.

In some implementations, the first graphical representation of the virtual trading floor associated with the exchange computer system is rendered on a monitor associated with the first computing device. The first graphical representation of the virtual trading floor associated with the exchange computer system can also be rendered on a virtual reality headset associated with the first computing device.

In some implementations, the first virtual trader can be located at a first location within the virtual trading floor. The first location within the virtual trading floor can be determined based on one or more parameters associated with the first market participant.

In some implementations, the exchange computer system is a distributed computer system including an order routing system, an order matching system, and a virtual floor engine.

Other implementations include corresponding systems, apparatus, computer-readable media, and computer programs recorded on computer storage devices, each configured to perform the operations of the methods.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
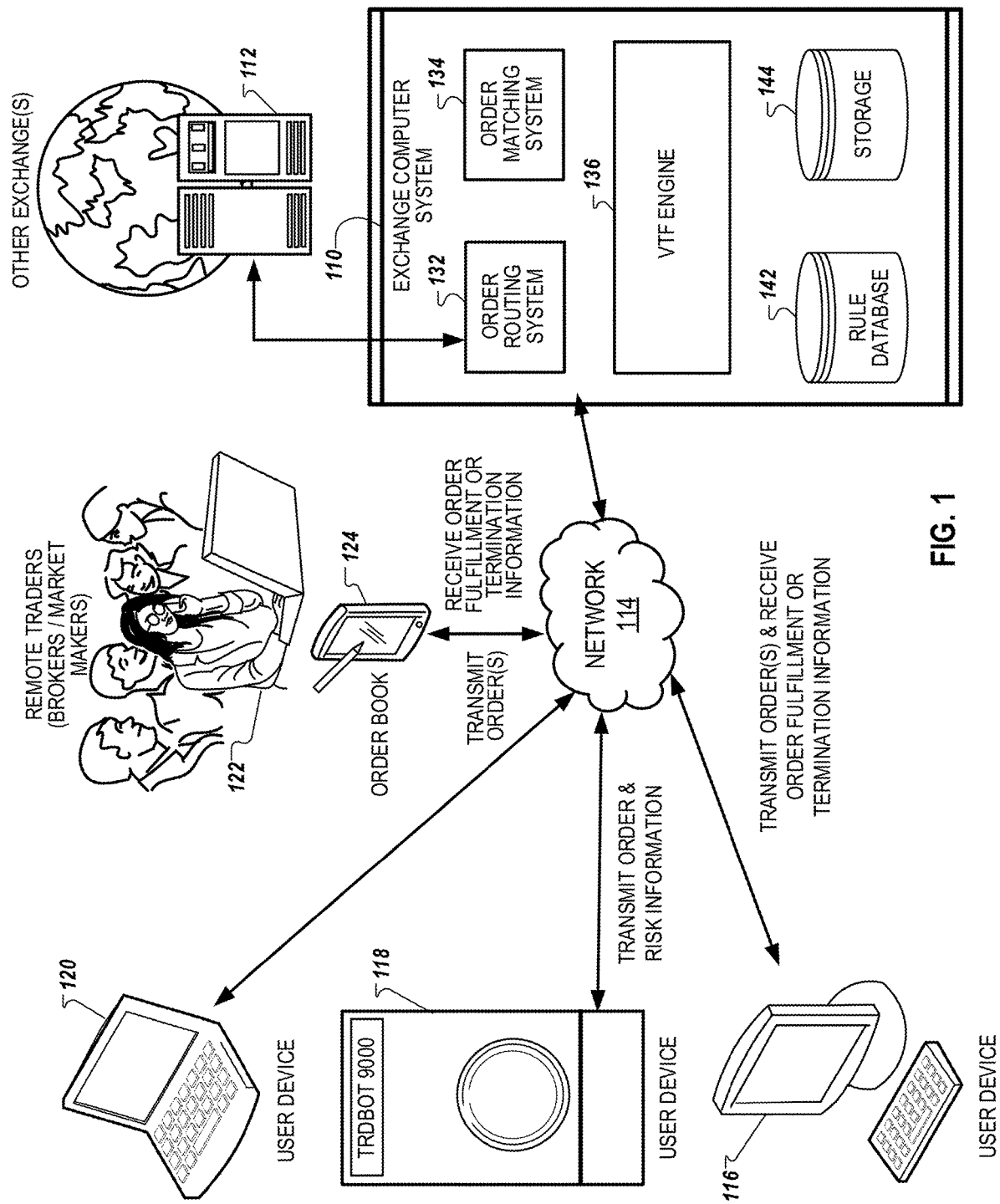
FIG. 1 is a diagram of an example of an exchange computer system that implements a VTF and associated networks, devices, and users.

FIG. 1 is a diagram of an exchange computer system and the associated networks, devices, and users that make up an exemplary trading environment in which that system operates. Generally, the term "user" can refer to any entity that interacts with the exchange computer system and/or associated networks and devices. Users can include, for example, market makers and other market participants, brokers, institutional traders, individual traders, and automated trading systems. The diagram includes an exchange computer system 110, other exchanges 112, a network 114, user devices 116, 118, 120, market makers/brokers 122, and electronic order book 124.

The exchange computer system 110 can be implemented in a fully electronic manner. The exchange computer system 110 can receive orders from remote electronic devices. The financial instruments can include securities such as stocks, options, futures, or other derivatives associated with an underlying asset.

Network 114 can connect various components within the trading environment, and is configured to facilitate communications between those components. Network 114 can, for example, be configured to enable the exchange of electronic communications that include order and order fulfillment information between connected devices, such as an electronic order book 124 and the exchange computer system 110.

Network 114 can include one or more networks or subnetworks, each of which can include a wired or wireless data pathway. Network 114 can, for example, include one or more of the Internet, Wide Area Networks (WANs), Local Area Networks (LANs), or other packet-switched or circuit-switched data networks that are capable of carrying electronic communications (e.g., data or voice communications).

In some implementations, the network 114 can include a communications network inclusive of hardware and software implemented on various systems, devices, and components connected to network 114. In some implementations, trader information, such as a trader's speech and actions, can be recorded by a user device (e.g., a computer or portable device such as a cellular phone) at the location of the trader using sensors, cameras and microphones, and can be continuously transmitted across the network 114 to other devices connected to the network 114. These devices can include, for example, a VTF engine 136 of the exchange computer system 110, which can be configured to gather information received from multiple connected market participants and translate that information into a virtual environment that facilitates open-outcry trading among and between the connected market participants. VTF engine 136 can, for example, generate a three-dimensional ("3D") graphical environment incorporating sights and sounds of a plurality of virtual traders representing the connected market participants.

To protect communications between the various systems, devices, and components connected to network 114, network 114 can implement security protocols and measures such that data identifying order or bid information, or parties placing orders or quotes, can be securely transmitted. Network 114 can, for example, include virtual private networks (VPNs) or other networks that enable secure connections to be established with exchange computer system 110.

User devices 116, 118, and 120 can include portable or stationary electronic devices, such as smartphones, laptops, desktops, and servers that include user interfaces to display information and receive user input, and that are configured to communicate over a computer network. User devices 116, 118, and 120 can communicate with the exchange computer system 110 over network 114 using a proprietary protocol, or a message-based protocol such as financial information exchange (FIX), implemented over TCP/IP.

In some implementations, user devices 116, 118, and 120 can include displays for displaying two-dimensional or three-dimensional representations of the VTF. The user devices 116, 118, and 120 can, for example, include or be coupled to components or devices that provision the display of 3D graphics. For example, the user devices 116, 118, and 120 can include or be coupled to graphical displays that include computer monitors, stereoscopic displays, projection systems, or virtual reality headsets. The user devices 116, 118, and 120 can include or be coupled to graphics engines and processors for processing high volumes of data to render 3D graphics in real time. In stereoscopic display systems, a user can view left and right eye images rendered by passive or active 3D graphics engines and processors.

The user device 116, 118, or 120 of a particular trader can record and send the trader's speech, image, and actions to the VTF, and can receive and output sights, sounds, and actions corresponding to virtual representations of other traders on the VTF in a manner that provides the trader with a complete visual and audio sensory experience of participating in an operating trading floor. The trader's user device 116, 118, or 120 can include input and output devices that allow the trader to enter into trades with other traders using speech and/or virtual movements such as hand signals and other gestures. As described in more detail below, the trader's user device 116, 118, or 120 can include various suitable hardware or software for displaying and rendering the VTF and for facilitating the trader's interactions on the VTF.

For example, a trader's user device 116, 118, or 120 can include or be connected to display monitors and speakers to output a graphical view and audio of the VTF to the trader. The trader's user device 116, 118, or 120 can include or be connected to one or more microphones, cameras, gyroscopes, and/or sensors to record the trader's speech and movements for transmission to a VTF engine 136 in an exchange computer system 110. If the trader's user device 116, 118, or 120 is portable, the trader's user device 116, 118, or 120 may record the trader's movement and report such movement in the VTF. For example, if the trader moves two steps to the right while connected to the trader's user device 116, 118, or 120, the trader's user device 116, 118, or 120 may report a movement of two steps to the right in the VTF to the VTF engine 136. In addition, or alternatively, such movements may be indicated by mouse, keyboard, or controller inputs. Accordingly, the trader's user device 116, 118, or 120 can be utilized as a user interface with the VTF.

In some implementations, the trader's user device 116, 118, or 120 can be a virtual reality head-set or can be coupled to a virtual reality head-set that displays a view of the VTF to the trader based on the direction the trader is facing with respect to one or more sensors, and the actions of virtual traders on the VTF in that field of view. To generate a viewpoint that mimics reality, in some cases, the headset may request the trader to provide height, weight, and other biographic information such as weight and images of the trader's face and body taken at one or more angles. This personal data can be used to generate a continuous 3D representation of the trader for use within the virtual environment by the VTF engine 136, the headset, or the trader's user device 116, 118, or 120.

The headset can include or be coupled to a microphone to allow the trader to record and transmit speech to the VTF engine 136, and speakers to output audio data received from the VTF engine 136. One or more sensors can be worn by the trader and/or attached to the headset to record the position and movements of the trader's head, arms, and hands. The headset can be wirelessly connected to the trader's user device 116, 118, or 120 for transmitting and receiving audio-visual data, sensor data, and/or data for executing a financial transaction. In some cases, the headset can be connected directly to network 114 and may transmit and receive data to and from the VTF engine 136 through network 114. In some implementations, a display or speaker on the trader's headset, a connected monitor display, or on the trader's user device 116, 118, or 120 can output visual or audio data, respectively, related to market information or supplementary information regarding activity on the VTF.

In some implementations, a trader can select one or more types of inputs, movements, gestures that can be recorded and used for manipulating a 3D representation of the trader in the VTF. The selection can be made using various suitable input devices including, but not limited to, a mouse, keyboard, pilot pen, or a user's finger. In some cases, instead of using the trader's actual movements and speech, the motions and speech of virtual traders are comprised partially or wholly of instructions from the trader for the trader's virtual 3D representation to engage in certain movements, speech, or trading activity on the VTF. To facilitate the selection, a graphical user interface can be provided on user device 116, 118, or 120 that would allow a trader to partially or wholly control the trader's presence on the VTF by selecting from a pre-established list of instructions. The instructions may allow the trader to select and control the types of actions or speech the trader would like to engage in on the VTF and/or to achieve a particular result with or without the trader engaging in particular actions or speech. Such an interface can allow a trader to change his or her view of the VTF at the trader's discretion or as determined by a trading activity. This interface can also allow a trader to be sitting down in reality but to be represented within the VTF by a standing virtual trader.

User devices 116, 118, and 120 can transmit user input such as order information or risk information to the exchange computer system 110, and can also receive data from the exchange computer system 110 indicating that an order has been filled or canceled.

Users such as brokers/market makers 122 can also place orders and receive information about order fulfillment or termination through electronic order book 124, which may include a record of outstanding public customer limit orders that can be matched against future incoming orders.

The exchange computer system 110 includes an order routing system (ORS) 132, an order matching system (OMS) 134, the VTF engine 136, a database of trading rules and algorithms 142, and storage 144. In some implementations, the exchange computer system 110 is a distributed computer system.

The order routing system (ORS) 132 determines whether a received order or quote is to be executed at the exchange computer system 110, or should instead be redirected to another exchange 112, and includes processing systems that enable the management of high data volumes. The ORS 132 can, for example, receive order or quote information for the purchase or sale of financial instruments from one or more user devices 116, 118, 120, and 124. In some implementations, the ORS 132 can also be connected to or include an electronic public automated routing (PAR) system that is accessible by brokers connected to the VTF.

Upon receiving an order or quote the ORS 132 determines if the destination specified in the received order or quote is the exchange computer system 110. If the exchange computer system 110 is not the destination, the ORS 132 forwards the order or quote to another exchange 112, which can be either the destination exchange, or an exchange en route to the destination exchange.

If the ORS 132 determines that the exchange computer system 110 is the destination of the received order or quote, the ORS 132 can forward the received order or quote to the order matching system 134.

The order matching system (OMS) 134 includes processing systems that analyze and manipulate orders according to matching rules stored in the database 142. The OMS 134 can also include an electronic book (EBOOK) of orders and quotes with which incoming orders to buy or sell are matched, according to the matching rules. The EBOOK can also be implemented in a separate database such as storage 144, which can include multiple mass storage memory devices for the storage of order and quote information. When the OMS 134 determines that a match exists for an order (for example, when a bid matches an offer for sale), the order matching system 134 can mark the matched order or quote with a broker-specific identifier so that the broker sending the order or quote information can be identified.

Orders matched by OMS 134 can for example, originate from within the VTF implemented by the exchange computer system 110, from other components of the exchange computer system 110, and/or from systems that are connected to the exchange computer system 110.

A VTF engine 136 can be implemented via the exchange computer system 110, and/or in another system that is connected to the exchange computer system 110 via network 114. The VTF engine 136 can include hardware and software for facilitating the rendering of the VTF at one or more user devices 116, 118, and 120. In some implementations, the VTF engine 136 can be configured to obtain data reflective of a physical trading floor, to obtain data indicative of traders' presence and actions within the physical trading floor, and to provide data for rendering a VTF at one or more user devices 116, 118, and 120. The VTF engine 136 can include an virtual trader database and a graphics engine.

The virtual trader database can store data for 2D and/or 3D graphical representations of traders who are members of the exchange system. In some implementations, data for graphical representations of any person (including, e.g., visitors) present on a physical trading floor or the VTF can be stored in the virtual trader database. Traders can be graphically represented in various ways. For example, in some implementations, a market participant can design or select an avatar to be used as the trader's 3D graphical representative within the VTF. The avatar can be, for example, an image of a character, creature, or other animate or inanimate object.

In some implementations, the trader can provide images of the trader (such as images of the trader's face and body) that can be used by the VTF engine 136 or software on the trader's user device 116, 118, or 120 to generate a graphical representation of the trader. Data used for generating a trader's graphical representation can be stored in the virtual trader database, and can be provided to other components of the VTF engine 136 and/or user devices 116, 118, and 120.

The VTF engine 136 can generate 2D and/or 3D representations of the VTF and can send data to user devices 116, 118, and 120 for configuring a display of the VTF on the user devices 116, 118, and 120. For example, the VTF engine 136 can obtain continuous or periodic real time images of a physical trading floor and generate 2D and/or 3D views of the physical trading floor and send data for rendering the 2D and/or 3D views of the physical trading floor to the user devices 116, 118, and 120. In this way, real time views reflective of various aspects of the trading floor such as lighting or furniture arrangement, can be accurately reflected in a virtual representation of the physical trading floor. The VTF engine 136 can, for example, utilize any suitable coordinate system to assign coordinates to map each point in the VTF to the physical trading floor. The coordinate system can be used to place various objects such as furniture and bodies of traders, and to measure and implement movements of traders in the VTF.

In addition, or alternatively, the VTF engine 136 may render a VTF that is visually distinct from the physical trading floor.

The VTF engine 136 can represent the VTF and associated virtual traders in various ways. For example, in some implementations, the VTF can be configured to include virtual representations of traders arranged in a particular configuration so that the ability for traders to interact with each other virtually is substantially the same, and such that each trader receives the same configured view of all virtual traders. The VTF engine 136 may alternatively be configured to arrange virtual traders at specific locations within the VTF, such that the experience of a user connected to the VTF varies depending on the placement of the virtual trader corresponding to the user.

The VTF engine 136 can include or be coupled to a database and can communicate with the database and/or user devices to obtain data for rendering 2D and/or 3D representations of a trader. For example, the VTF engine 136 can obtain data for graphically representing a user as a virtual trader within the VTF, and can obtain or generate location data indicating the virtual trader's location within the VTF. The VTF engine 136 can then place the virtual trader at the location within the VTF indicated by the location data.

The VTF engine 136 can also provide data indicative of the activities of one or more virtual traders within the VTF to user devices 116, 118, and 120. For example, audio-visual data indicative of movements or speech of a plurality of virtual traders can be provided to user devices 116, 118, and 120 such that the users of those devices can benefit from listening to real-time conversations and viewing real-time interactions occurring between the virtual traders on the VTF. As noted above, each trader's speech and actions can be recorded by user devices 116, 118, and 120 using sensors, cameras, microphones, and/or other devices. In general, the recording, processing and sending of trader activity and floor activity can be implemented in near real-time or delayed, or accomplished pursuant to a timing scheme required by the rules of the exchange computer system 110.

Storage 144 and database 142 store and handle data in a manner that satisfies the privacy and security requirements of the exchange computer system 110 and its users, and can store one or more of telemetric data, user profiles, user history, and rules and algorithms for matching quotes, bids, and orders. In some implementations, storage 144 may include a database utilized by VTF engine 136.

Database 142 can store data that specifies the rules by which the exchange computer system 110 can operate, as well as specific rules for the operation of VTF engine 136. For example, database 142 can include rules that determine a particular size and shape (including changes in vertical space) of the VTF to optimize trading for a number of traders participating in trading on a particular day. The size and/or shape of the VTF can be generated by rules-based algorithms and, in some cases, can be dependent on certain factors such as the number of participants on the VTF. The database 42 can also store rules for modifying existing requirements and rules of the exchange computer system 110.

In some implementations, the locations of virtual traders on the VTF can be determined by a set of rules or an algorithm based on trader preference, tenure, trading activity or other parameters, or a combination of the foregoing parameters. Additionally, real-time information about the trading activity of other traders on the VTF can be provided to each trader so they would not only have consolidated information about the market from traditional sources, but would also have detailed information about activity occurring within the VTF itself.

To comply with security requirements, upon completion of a trade within the VTF (for example, through automatic execution through the OMS 134), fill information for an order is passed through the OMS 134 and the ORS 132 to one or more user devices 116, 118, 120, and 124. The OMS 134 matches the buy side and sell side of a trade, and forwards the matched trade to a third party organization that verifies the proper clearance of the trade, such as the Options Clearing Corporation (OCC) where the securities can be options, or Depository Trust Company (DTC) where the securities can be equities. The OMS 134 can also format the quote and sale update information and send that information through an internal distribution system that refreshes virtual displays within the VTF, in addition to submitting the information to a quote and trade dissemination service such as, in the case of options, the Options Price Reporting Authority (OPRA). In the case of Equities, the information would be submitted to the Securities Information Processor (SIP).

Figure 2:
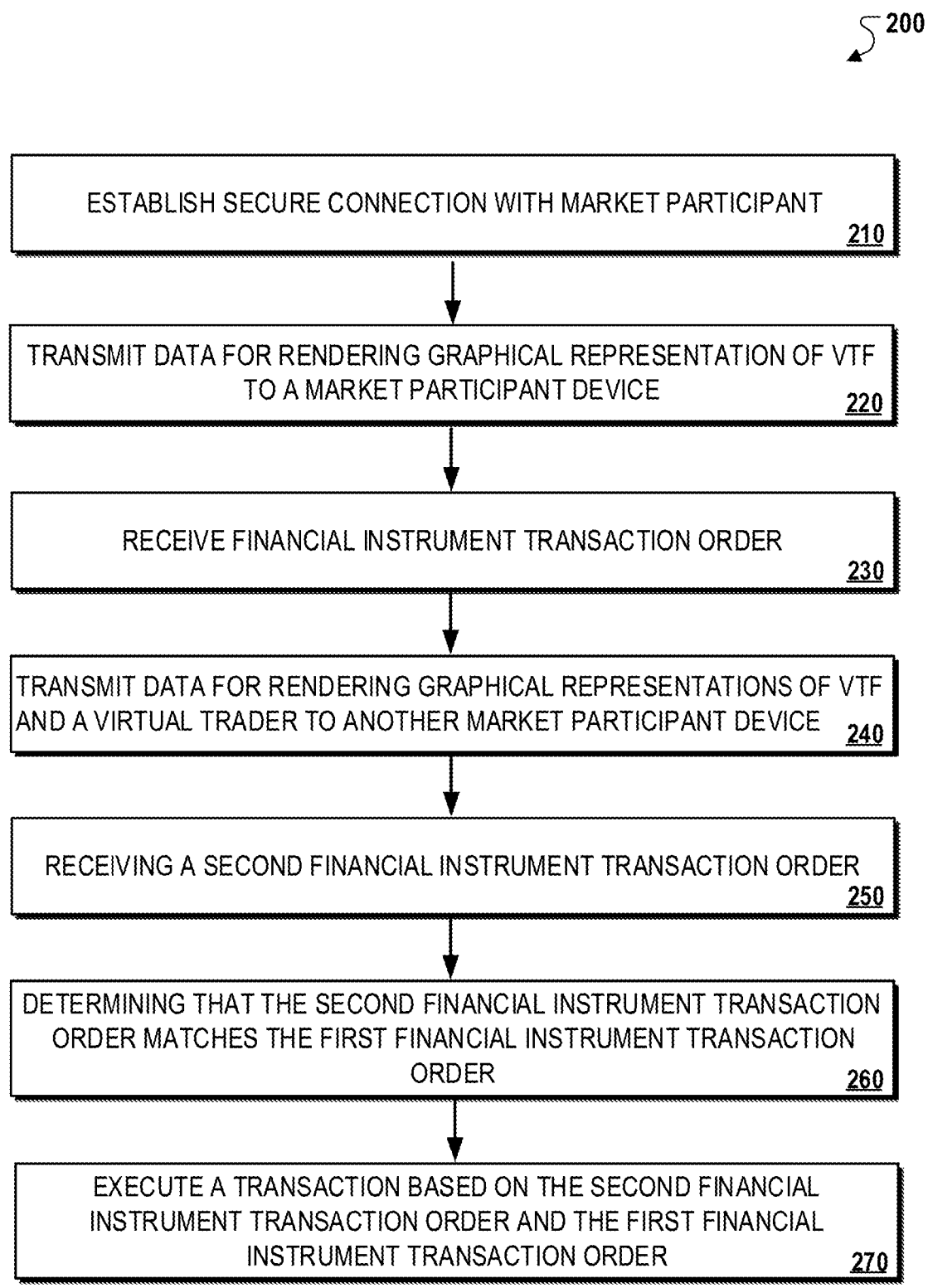
FIG. 2 is a flowchart of an example process for implementing a trade through the VTF.

FIG. 2 is a flowchart of an exemplary process 200 for implementing a trade through the VTF. The operations described in FIG. 2 can be performed by the exchange computer system 110 such as the VTF engine 136. The market participants referred to in reference to FIG. 2 may correspond to the users of user devices 116, 118, and 120 in FIG. 1.

To execute trades and interact with the VTF, it is important that the connection of any device to the exchange computer system 110 is secure. Accordingly, to allow a particular market participant to interact with the VTF, the exchange computer system 110 establishes a secure connection with that market participant's user device (operation 210). Various suitable methods, including but not limited to encryption, encoding, secure key or password-based access, secured gateways, virtual private networks, and steganography, can be used to establish a secure connection between the exchange computer system 110 and a market participant's device.

The term "market participant" may refer to a trader, broker, or any other individual with an interest in buying, selling, or holding of a financial instrument. Market participants typically price their bids and offers based on market conditions, which are subject to rapid change, and electronic exchanges often match bids and offers based on priority rules including price-time priority, and the principle of first-in, first-out (FIFO). A market participant can interact with the exchange computer system 110 to perform various operations such as setting up an account to perform trades, transmitting and receiving order information, and transmitting and receiving other information related to the valuation of various securities and financial instruments.

After a market participant (e.g., a first market participant) has established a secure connection with the exchange computer system 110, the exchange computer system 110 can transmit data to the market participant's user device to render a graphical representation of a VTF associated with the exchange computer system 110 through a graphical user interface of the market participant's user device (operation 220). The market participant's user device may, for example, include a graphics processor and a display for displaying a 3D representation of the VTF. The data received from the exchange computer system 110 may include volume data, coordinate data, left and right eye images, and other data that would facilitate the rendering of the VTF at the market participant's user device.

While viewing the VTF on the market participant's user device, the market participant can select how to interact with the VTF and the types of operations and inputs (e.g., gestures and/or commands) that apply to the VTF. In some cases, the market participant can create and control one or more virtual traders in the form of 2D and/or 3D graphical representations of the market participant in the manner described above with respect to FIG. 1.

To conduct a transaction through the VTF, the market participant can provide input through the market participant's user device specifying details of a financial instrument transaction order that the market participant would like to place with the exchange computer system 110. The details can include order type, volume, offer or bid pricing, and any other information pertinent to executing the financial instrument order. The details can be provided through various suitable means; for example, orally, through one or more physical gestures, or through inputs provided via a user interface for placing orders. The market participant's user device can then transmit data related to the details of the financial instrument transaction order to the exchange computer system 110.

The exchange computer system 110 can receive the financial instrument transaction order information from the market participant's user device (operation 230) and can perform one or more operations such as the operations implemented by the order routing system 132, order matching system 134, and VTF engine 136, as described above with respect to FIG. 1.

The exchange computer system 110 can also transmit data to another market participant's user device (e.g., a second market participant's user device) that causes a graphical user interface of the other market participant's user device to render a 3D graphical representation of the VTF (operation 240) that includes a 3D graphical representation of a virtual trader corresponding to the first market participant engaged in virtual actions and/or movements. The actions can include, for example, gestures representing placement of an order based on the financial instrument transaction order information received from the first market participant's user device in operation 230 described above. For instance, the virtual trader representing the first market participant may perform a gesture such as a hand signal or nod indicating a possible transaction or order.

The second market participant can also provide input through the second market participant's user device specifying details of a financial instrument transaction order that the second market participant would like to place with the exchange computer system 110. The details can include order type, volume, offer or bid pricing, and any other information pertinent to executing the financial instrument order. The second market participant's user device can then transmit this data to the exchange computer system 110.

The exchange computer system 110 can receive the financial instrument transaction order information from the second market participant's user device (operation 250) and can perform one or more operations such as the operations implemented by the order routing system 132, order matching system 134, and VTF engine 136, as described above.

In some implementations, the exchange computer system 110 can also receive data for configuring a 3D graphical representation of the second market participant from the second market participant's user device. Similar to the first market participant, the second market participant can be represented within the VTF by a corresponding virtual trader. The exchange computer system 110 can provide data for displaying a virtual trader corresponding to the second market participant on the VTF to user devices that have a secure connection with the exchange computer system 110

(including the second market participant's user device). Actions, movements, or verbal commands made by the second market participant can then be represented within the VTF by the virtual trader corresponding to the second market participant.

In some implementations, the order matching system 134 of the exchange computer system 110 can determine that the financial instrument transaction order received from the second market participant matches the financial instrument transaction order from the first market participant (operation 260), and can execute a transaction based on these orders (operation 270). As described above, the OMS 134 can match a buy side with the sell side of a trade, and can forward the matched trade to a third party organization, e.g., OCC or DTC, that verifies the proper clearance of the trade and/or organizations such as OPRA and SIP. Using the foregoing method depicted in FIG. 2, traders can offer, issue, trade and clear customized tradeable products offered for trading on a virtual exchange.

In addition to helping traders completing financial transactions, the exchange computer system 110 can also provide analytics data and statistics to traders and store data for recordkeeping and reporting. For example, the exchange computer system 110 can determine what trades occurred and how market participants operated their respective virtual traders, thereby simplifying exchange operations, recordkeeping and compliance. The exchange computer system 110 can use this data to publish periodic reports for trades and/or virtual trader behavior and tendencies.

It will be understood that various modifications can be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together. The term "and/or" is also intended to be construed in this manner.

The use of the terms "first," "second," "third," etc., are not necessarily used herein to connote a specific order or number of elements. Generally, the terms "first," "second," "third," etc., are used to distinguish between different elements as generic identifiers. Absent a showing that the terms "first," "second," "third," etc., connote a specific order, these terms should not be understood to connote a specific order. Furthermore, absent a showing that the terms "first," "second," "third," etc., connote a specific number of elements, these terms should not be understood to connote a specific number of elements.

What is claimed is:

1. An exchange computer system comprising:
   one or more user devices of a plurality of market participants conducting electronic trades in the exchange computer system;
   a plurality of sensors configured to monitor the plurality of market participants and generate a continuous stream of sensor readings indicative of market participant movements, wherein the continuous stream of sensor readings includes dynamic images taken at one or more angles from at least one sensor; and
   a virtual trading floor engine comprising one or more processing devices configured to execute instructions stored in one or more non-transitory machine-readable storage devices, the instructions, when executed, cause the one or more processing devices to perform operations comprising:
      receiving, from the plurality of sensors through a computer network comprising the one or more user devices and configured to communicate with the exchange computer system, the continuous stream of sensor readings comprising data indicative of the market participant movements, wherein the market participant movements include hand gestures and head nods;
      generating, using the continuous stream of sensor readings, a graphical user interface (GUI) displaying graphical representations of the plurality of market participants in a virtual trading floor of an exchange handled by the exchange computer system;
      identifying, based on changes in a first graphical representation of a first market participant, data indicative of an open outcry trade initiated by the first market participant using a first user device; and
      executing, using the data indicative of the open outcry trade, a corresponding electronic trade within the exchange computer system, including 1) matching a first financial instrument transaction order of the corresponding electronic trade to a second financial instrument transaction order, and 2) executing, by the exchange computer system, a transaction based on the first financial instrument transaction order and the second financial instrument transaction order.

2. The exchange computer system of claim 1, wherein the virtual trading floor is rendered on a first GUI as if the first market participant is viewing the virtual trading floor from one or more angles facing at least one sensor on the first user device.

3. The exchange computer system of claim 2, wherein the first GUI of the first user device is configured to receive inputs for controlling the first graphical representation of the first market participant.

4. The exchange computer system of claim 3, wherein the inputs for controlling the first graphical representation of the first market participant are received via a mouse and keyboard associated with the first user device.

5. The exchange computer system of claim 3, wherein the inputs for controlling the first graphical representation of the first market participant are received via a microphone associated with the first user device.

6. The exchange computer system of claim 2, wherein the first GUI renders the virtual trading floor based, at least in part, on information provided by the virtual trading floor engine, and wherein the exchange computer system is a distributed computer system having an order routing system and an order matching system.

7. The exchange computer system of claim 1, wherein the first graphical representation is a three-dimensional graphical representation of the first market participant and is based on personal biographic information of the first market participant derived from the plurality of sensors.

8. The exchange computer system of claim 1, wherein the virtual trading floor is rendered to stream a display that is indicative of the market participant movements of the plurality of market participants.

9. The exchange computer system of claim 1, wherein data indicative of the market participant movements comprises one or more inputs derived from the plurality of sensors.

10. The exchange computer system of claim 3, wherein the inputs for controlling the first graphical representation of the first market participant are received via one or more sensors associated with the first user device.

11. The exchange computer system of claim 1, wherein the first graphical representation is rendered on a monitor associated with the first user device.

12. The exchange computer system of claim 1, wherein the first graphical representation is rendered on a virtual reality headset associated with the first user device.

13. The exchange computer system of claim 1, wherein the first graphical representation of the first market participant is located at a first location within the virtual trading floor.

14. The exchange computer system of claim 13, wherein the first location within the virtual trading floor is determined based on one or more parameters associated with the first market participant.

15. The exchange computer system of claim 1, wherein receiving the continuous stream of input comprises:
  obtaining a height and a weight of the first market participant;
  obtaining a position and a movement of the first market participant; and
  representing the first market participant on the virtual trading floor using at least the height, the weight, the position, and the movement of the first market participant, wherein at least one of the height and the weight of the first market participant is obtained from sensor measurement by the first user device.

16. The exchange computer system of claim 1, wherein the plurality of sensors includes one or more of sensors worn by the first market participant and sensors attached to a headset worn by record the first market participant, and wherein the plurality of sensors collect data indicative of positions and movements of the head, arms, and hands of the first market participant.

17. The exchange computer system of claim 1, wherein the plurality of sensors include microphones configured to capture speech of the first market participant.

18. A computer-implemented method comprising:
  receiving, from a plurality of sensors through a computer network comprising one or more user devices of a plurality of market participants conducting electronic trades in an exchange computer system, a continuous stream of sensor readings comprising dynamic images taken at one or more angles from at least one sensor indicative of market participant movements, wherein the plurality of sensors are configured to monitor the plurality of market participants and generate the continuous stream of sensor readings indicative of the market participant movements, wherein the market participant movements include hand gestures and head nods, and wherein the one or more user devices are configured to communicate with the exchange computer system;
  generating, using the continuous stream of sensor readings, a graphical user interface (GUI) displaying graphical representations of the plurality of market participants in a virtual trading floor of an exchange handled by the exchange computer system;
  identifying, based on changes in a first graphical representation of a first market participant, data indicative of an open outcry trade initiated by the first market participant using a first user device; and
  executing, using the data indicative of the open outcry trade, a corresponding electronic trade within the exchange computer system, including 1) matching a first financial instrument transaction order of the corresponding electronic trade to a second financial instrument transaction order, and 2) executing, by the exchange computer system, a transaction based on the first financial instrument transaction order and the second financial instrument transaction order.

19. A non-transitory computer-readable storage medium storing instructions that, when executed by one or more processors in an exchange computer system, cause the one or more processors to perform operations comprising:
  receiving, from a plurality of sensors through a computer network comprising one or more user devices of a plurality of market participants conducting electronic trades in the exchange computer system, a continuous stream of sensor readings comprising dynamic images taken at one or more angles from at least one sensor indicative of market participant movements, wherein the plurality of sensors are configured to monitor the plurality of market participants and generate the continuous stream of sensor readings indicative of the market participant movements, wherein the market participant movements include hand gestures and head nods, and wherein the one or more user devices are configured to communicate with the exchange computer system;
  generating, using the continuous stream of sensor readings, a graphical user interface (GUI) displaying graphical representations of the plurality of market participants in a virtual trading floor of an exchange handled by the exchange computer system;
  identifying, based on changes in a first graphical representation of a first market participant, data indicative of an open outcry trade initiated by the first market participant using a first user device; and executing, using the data indicative of the open outcry trade, a corresponding electronic trade within the exchange computer system, including 1) matching a first financial instrument transaction order of the corresponding electronic trade to a second financial instrument transaction order, and 2) executing, by the exchange computer system, a transaction based on the first financial instrument transaction order and the second financial instrument transaction order.

* * * * *